(12) United States Patent  (10) Patent No.: US 9,170,666 B2
Suggs et al.  (45) Date of Patent: Oct. 27, 2015

(54) REPRESENTATIVE IMAGE

(75) Inventors: Bradley Neal Suggs, Sunnyvale, CA (US); John J. Briden, San Francisco, CA (US); John P. McCarthy, Pleasanton, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 405 days.

(21) Appl. No.: 13/386,913

(22) PCT Filed: Feb. 25, 2010

(86) PCT No.: PCT/US2010/025469
§ 371 (c)(1),
(2), (4) Date: Jan. 25, 2012

(87) PCT Pub. No.: WO2011/106008
PCT Pub. Date: Sep. 1, 2011

(65) Prior Publication Data
US 2012/0120015 A1 May 17, 2012

(51) Int. Cl.
G06F 3/041 (2006.01)
G06F 3/01 (2006.01)
G06F 3/0488 (2013.01)

(52) U.S. Cl.
CPC ............... *G06F 3/041* (2013.01); *G06F 3/017* (2013.01); *G06F 3/04883* (2013.01); *G06F 2203/04101* (2013.01)

(58) Field of Classification Search
USPC .................................................. 345/173–182
See application file for complete search history.

(56) References Cited

U.S. PATENT DOCUMENTS

| | | | |
|---|---|---|---|
| 6,222,465 B1 * | 4/2001 | Kumar et al. | 341/20 |
| 8,381,135 B2 * | 2/2013 | Hotelling et al. | 715/863 |
| 2002/0126161 A1 | 9/2002 | Kuzunuki et al. | |
| 2004/0189720 A1 * | 9/2004 | Wilson et al. | 345/863 |
| 2007/0003915 A1 | 1/2007 | Templeman | |
| 2007/0279591 A1 * | 12/2007 | Wezowski et al. | 351/208 |
| 2009/0027337 A1 | 1/2009 | Hildreth | |
| 2009/0077501 A1 | 3/2009 | Partridge et al. | |
| 2009/0100383 A1 | 4/2009 | Sunday et al. | |
| 2009/0183125 A1 | 7/2009 | Magal et al. | |
| 2009/0201270 A1 | 8/2009 | Pikkujamsa et al. | |
| 2009/0228841 A1 | 9/2009 | Hildreth | |
| 2009/0268945 A1 | 10/2009 | Wilson et al. | |
| 2010/0251171 A1 * | 9/2010 | Parulski | 715/810 |

FOREIGN PATENT DOCUMENTS

CN 101379456 A 3/2009

OTHER PUBLICATIONS

International Searching Authority, International Search Report and Written Opinion, Appln No. PCT/US2010/025469, date of mailing Nov. 22, 2010, 9 p.
Robust Hand Gesture Analysis and Application in Gallery Browsing, Xiujuan Chai; Yikai Fang; Kongqiao Wang, 2009 IEEE, Jun. 28, 2009-Jul. 3, 2009. pp. 938-941.
Office Action, CN Application No. 201080065760.0, Date Issued: Oct. 31, 2014, pp. 1-7.

* cited by examiner

*Primary Examiner* — Kenneth B Lee, Jr.
(74) *Attorney, Agent, or Firm* — Hewlett-Packard Patent Department

(57) ABSTRACT

A system including a display, a sensor and a controller. The sensor can detect an object and generate data related to the object. The controller can determine a first pose of the object from the data and display a first representative image on the display. The controller can determine a second pose of the object and display a second representative image on the display, wherein the second representative image is associated with a displayed element.

14 Claims, 8 Drawing Sheets

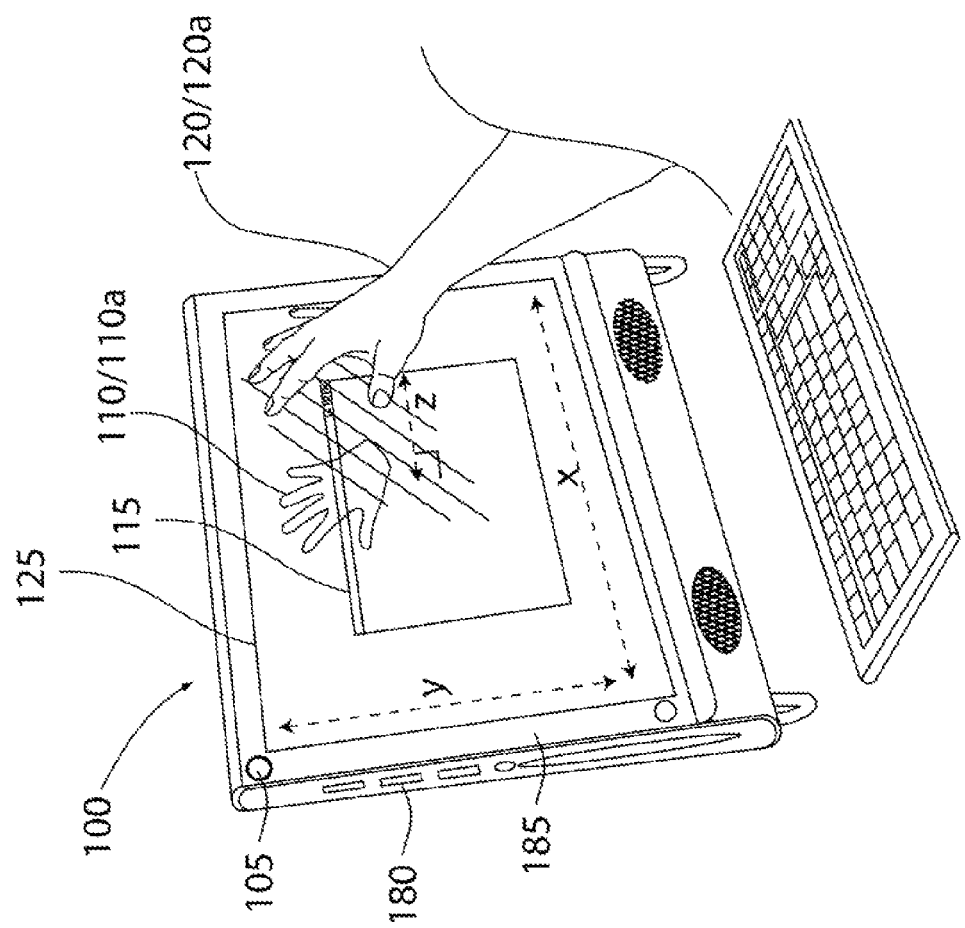

REPRESENTATIVE IMAGE

BACKGROUND

A user can interact with a system using a touch interface. The touch interface on a display can detect when a user makes contact with the display and the system can determine if a task is to be performed according to the coordinates where the touch occurred. The touch may be determined by an optical system detection system, a capacitive detection system, resistive detection system or another detection system. If the user is not touching the system, the system is not going to perform tasks that would be initiated by a touch of the system.

BRIEF DESCRIPTION OF THE DRAWINGS

Some embodiments of the invention are described with respect to the following figures:

FIG. 1A is a system according to an example embodiment of the invention;

DETAILED DESCRIPTION

Figure 1B:
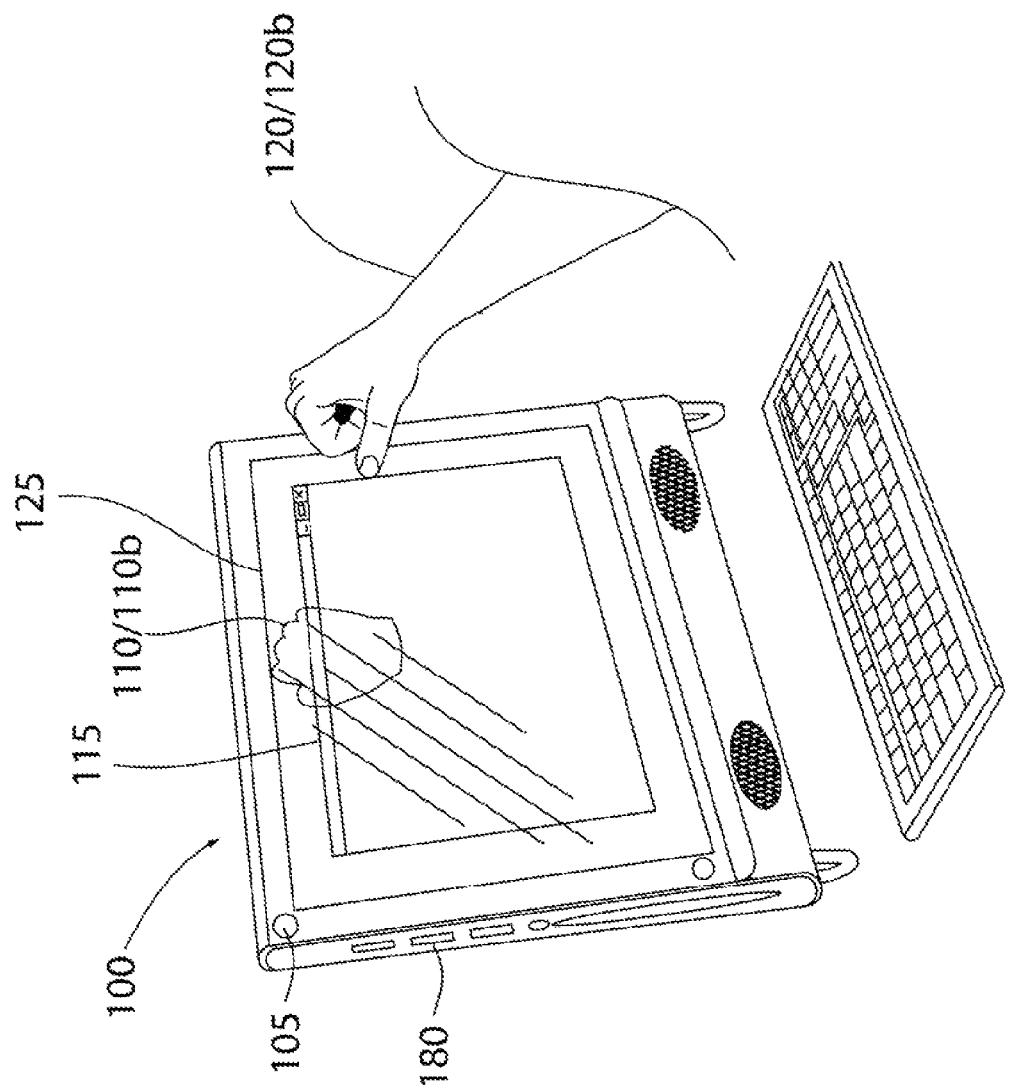
FIG. 1B is a system according to an example embodiment of the invention.

A touch screen display using a touch detector such as a two dimensional optical system, capacitive or resistive detection system cannot detect movement in front of the display. A system that can determine the pose of an object such as a user's hands and fingers in front of the display can be used as an input. If the system can determine the pose of an object in front of the display the system can also determine if the object is changing poses. For example the system can determine if the object is in a first pose and then at a later time if the object is in a second pose different from the first pose. The change in pose may be a gesture that can be determined by the system to perform a task on the system. The pose may be the position, shape or posture of a user's hand and may be determined for example by the positions of the fingers relative to the palm of a hand.

If the object is for example a user's hand and the object is not touching the display it may be difficult for the user to tell where on the display the system is equating the position of the user's hand. For example if the users hand is 30 centimeters from the screen and the screen is tilted back at a 10 degree angle the user's perception of the coordinates of the hand may be different than coordinates that are determined by the system. In one embodiment the system can determine the coordinates of the object and display a representative image on the display at the coordinates determined by the system.

In an embodiment a system can include a display and a sensor to detect an object and generate data related to the object. A controller can determine a first pose of the object from the data and display a first representative image on the display. The controller can determine a second pose of the object and display a second representative image on the display, wherein the second representative image is associated with a displayed element.

In an embodiment a method of displaying a representative image can include detecting a position of an object with a sensor. The method can also include displaying on a display a first representative image on the display indicating a first pose of the object on the two dimensional display if the object is within a volume from the display. The method can also include displaying a second representative image representing a second pose of the object.

With reference to the figures, FIG. 1A is a system according to an example embodiment of the invention. The system 100 includes a display 125 to display images. The display 125 may be for example a liquid crystal display (LCD), digital light processing (DLP), Organic LCD (OLED), Cathode. Ray Tube (CRT) or another display technology. The system 100 can include a sensor 105 to detect an object and generate data related to the object. The sensor 105 can be for example a three dimensional sensor that can determine the position of an object in x, y, and z coordinates, although other coordinate systems can be used to determine the pose in three dimensions. For example the sensor may be an optical sensor such as a time of flight sensor, a structured light sensor, a stereo sensor, or another type of sensor. In one embodiment an enclosure 185 includes the sensor 105 and the display 125. In one embodiment the sensor 105 is behind a protective layer in front of the display 125.

A controller 180 can be used to determine from the data collected from the sensor 105 different characteristics of the object 120. An example of the object 120 in a first pose is object 120a and an example of the representative image 110 is first representative image 110a. For example the data collected may be used to determine the position of the object 120 in x, y, and z coordinates. In one embodiment the controller 180 may receive data from the sensor about the characteristics of the object 120 but in another embodiment the controller 180 may also communicate with the object 120 wirelessly though a communications channel. For example if a user has something in their hand the controller 180 may communicate with the object 120 wirelessly and in addition to receiving data from the sensor 105. The data can also be used to determine other characteristics of the object 120 such as the roll, yaw or pitch. The characteristics of the object can be used to determine the pose of the object. For example if the object 120a is a user's hand then the characteristics of the object 120a may be whether the hand is open or closed, palm up or palm down. The controller 180 may be a specialized controller for the touch system or may be for example a general purpose processor. The controller 180 may be or may be part of a computing system, for example a portable computer, desktop computer, or personal digital assistant. In an embodiment the controller may be in the same enclosure 185 as the display or may be a separate device.

A controller 180 can determine a first pose of the object 120a from the data and display a first representative image 110a on the display. The first representative image 110a may be for example an image of a hand. The representative image can be displayed according to characteristics of the object 120. For example if the object 120 is a user's right hand the representative image 110 can be of a right hand and if the object 120 is a left hand the representative image 110 can be of a left hand. The representative image 110 may be approximately the same size as the object 120 or may be larger or smaller than the object 120. The position of the representative image 110 may be for example at the x and y coordinates of the object 120. The dimensions of the representative image 110 may be determined by the z coordinates of the object 120 in front of the display 125.

The display 125 can include a displayed element 115. The displayed element can be for example a window, an icon or another displayable element 115. The x and y coordinates can be determined by the controller 180. The controller 180 can associate the coordinates of the displayed element 115 with the coordinates of the object 120 or with the coordinates of the representative image 110. In one embodiment displayed element 115 is associated with the object 120 or the representative image 110 if the pose of the object 120 is closed, for example a closed hand. The closed hand may represent grabbing the displayed element 115.

FIG. 1B is a system according to an example embodiment of the invention. The system can determine a second pose 110b of the object and display a second representative image on the display. In one embodiment a storage can include multiple poses for the representative image. In one embodiment the poses can be user selected to correspond with the characteristics of the object. For example, the user may select a representative image that resembles a closed hand or first 110b. If the controller 180 determines that characteristics of the object 120 correspond to the second pose the controller can change the representative image 110a from that of a first pose to a representative image 110b of the second pose. An example of the object 120 in a second pose is object 120b and an example of the representative image 110 is the second representative image 110b.

In one embodiment a threshold may determine the pose that the controller chooses for the representative image 110a or 110b. For example if the object 120a is an open hand the controller, may display the first pose 110a but as the object 120 transitions to a closed hand the characteristics of the object 120 change but the controller 180 may continue to display the first pose of the object 120a until the threshold is reached. For example, the threshold may be 40 percent closed. If the threshold is reached the controller 180 displays the second pose in one embodiment. The threshold may be different depending on the starting pose of the object 120a or 120b. For example the threshold for changing the representative image 110 if the object 120 is transitioning from an open hand to a closed hand may be different than the threshold for changing the representative image 110 if the object 120 is transitioning from a closed hand to an open hand.

In another embodiment, there may be intermediate poses between the open pose and the closed pose. If there are intermediate poses the controller 180 can represent the characteristics of the object 120 with a representative image 110 that for example is not open and is not closed but is between an open representative image and a closed representative image. The intermediate representative images may be stored or may be generated as needed from the characteristics and data about the object 120a or 120b.

The second representative image 110b can be associated with a displayed element 115. The displayed element 115 can be an image that is displayed by the display 125. The coordinates of the displayed element 115 may include for example the position, width, height, or other data of the displayed element 115. The controller can determine if the coordinates of the object 120 correspond to the coordinates of the representative image 110b. For example if the displayed element 115 is a window and the window has a top edge the controller can determine if the representative image 110 is at the top edge of the window. The controller 180 may associate the position of the object 120 with the display element 115 or may associate the representative image with the display element 115 if there are differences between the coordinates of the object 120 and the representative image 110. In one example the association may be a range of allowable positions where the object 120 is associated with the displayed element 115. For example if the middle point of the representative image is aligned with the top of the displayed element 115 the representative image 110 and the display element may be associated but there may also be a range where if the representative image is higher than the top edge of the displayed element the controller 180 can associate the representative image 110 with the displayed element 115. An example may be if the representative image is 1 centimeter above or below the edge of the displayed element the controller 180 associates the elements.

In one embodiment the controller 180 can associate the representative image with any portion of the displayed element. In one embodiment the displayed element 115 may include a first area where a representative image 110 may be positioned so that the controller can associate the representative image 110 with the displayed element 115. For example if displayed image may include a symbol that indicates where the representative image can be positioned so that the controller can associate the representative image 110 with the displayed element 115.

In one embodiment the representative image 110 may change characteristics to indicate that the controller can associate the representative image 110 with the displayed element. In one embodiment the representative image 110 may change characteristics to indicate that the controller has associated the representative image 110 with the displayed element 115. The characteristic that could change are all or a portion of for example the color of the displayed element, the transparency of the displayed element, the brightness of the displayed element or another characteristic of the displayed element 115. In another embodiment a characteristic of the representative image may change to indicated that an association has been made. The characteristics may be a change in color, transparency, or brightness of the representative image 110 for example.

Figure 2A:
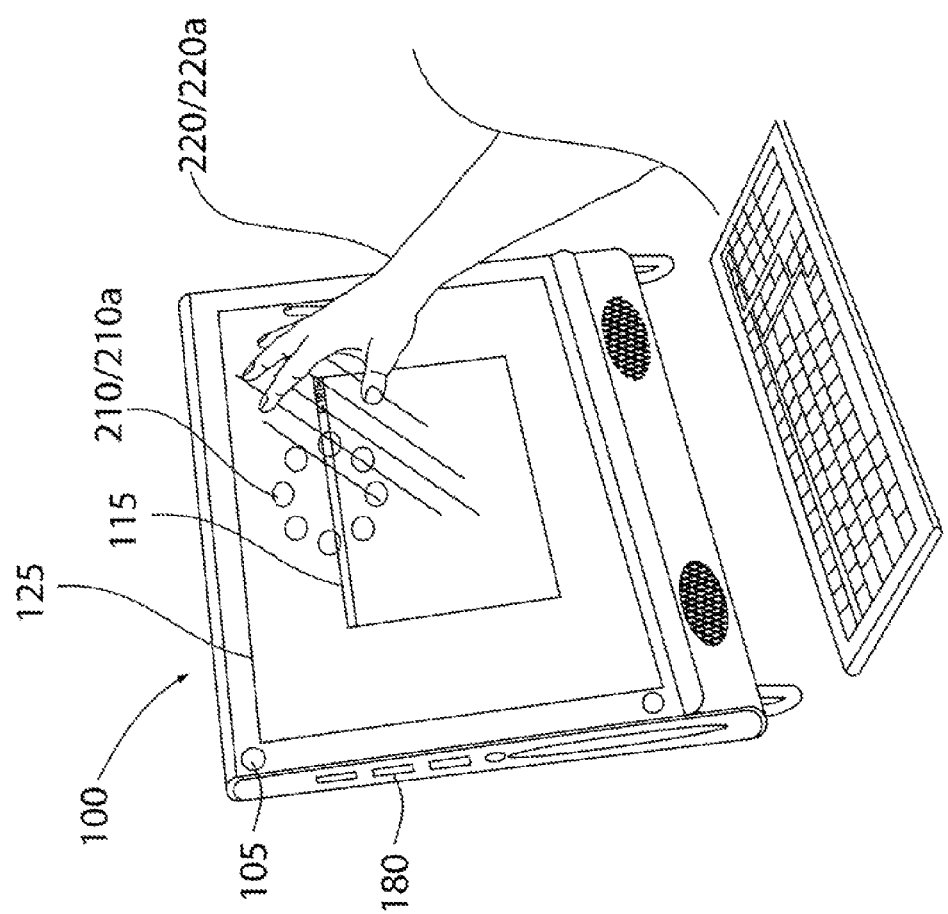
FIG. 2A is a system according to an example embodiment of the invention.

FIG. 2A is a system according to an example embodiment of the invention. The system 100 can include a display 125. The display 125 can display a first representative image 210a. An example of the object 220 in a first pose is object 220a and an example of the representative image 210 is the first representative image 210a. The display 125 can display a displayed element 115. In one embodiment the representative image 210a can be chosen by the user, the representative image 210a may be for example an image that is radially symmetric such as a circle or a set of images arranged in a circle. The representative image may also be a polygon such as a square, rectangle, octagon or another polygon or shape. The representative image may also be the shape of objects in nature such as a hand. The representative image 210a can be selected to represent the pose of the object 220a. For example the representative image may include a set of images that are arranged in a radially symmetric pattern but none of the images in the set are touching indicated that the object 220 has multiple digits that are not touching such as an open hand.

Figure 2B:
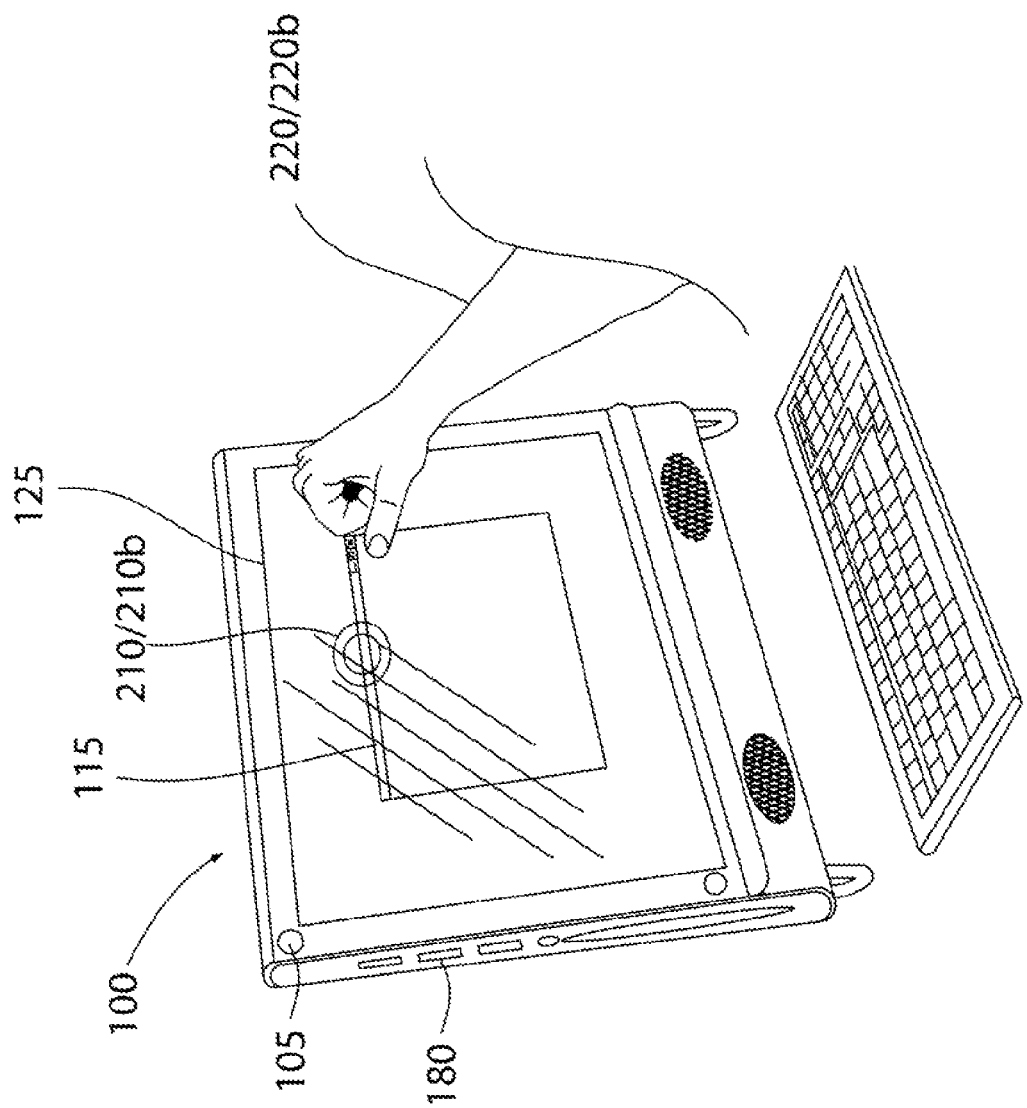
FIG. 2B is a system according to an example embodiment of the invention.

FIG. 2B is a system according to an example embodiment of the invention. A controller 180 receives data from the sensor 105. The data received by the controller can be used to determined characteristics of the object 220b. For example, the data can be used to determine if the object 220b is closed or open. An example of the object 220 in a second pose is object 220b and an example of the representative image 210 is the second representative image 210b. If for example the object is closed the controller 180 can display a representative image 210b that indicates that the object 220b is closed. For example, the controller may indicate that the object 220b is closed by displaying a representative image 110 as completed circle. Representative image 210b of the closed object may be related to the representative image 210b of the open object, for example the representative image 210b of the closed object may be the radially symmetric representative image 210a but may have a smaller diameter than the representative image 210a representing the open object 220a. In one embodiment, the representative images 210a and 210b may not be related for example the representative image 110a may be a circle and the representative image 110b may be a square. In one embodiment, the object 220a may be open if for example the object 220a is a hand and the fingers are extended and the object 220b may be closed if for example the object 220b is a hand and the fingers and a palm of the hand are touching.

Figure 2C:
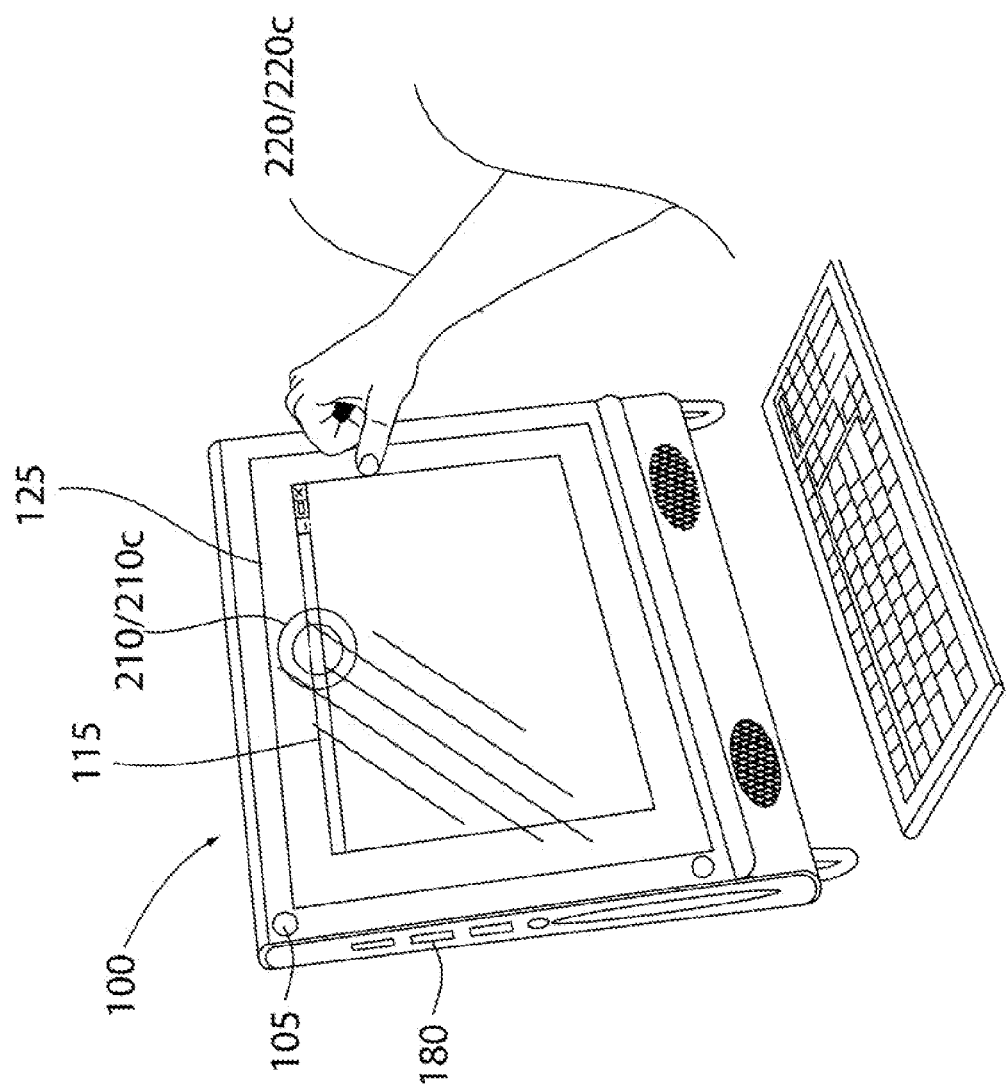
FIG. 2C is a system according to an example embodiment of the invention.

FIG. 2C is a system according to an example embodiment of the invention. The controller 180 can determine from the data received from the sensor 105 the position of the object 220c. An example of the object 220 is object 220c and an example of the representative image 210 is the representative image 210c. The position of the object 120c can be determined for example by a coordinated system. The coordinated system may include x, y and z coordinates where x is a width of the display, y is a height of the display and z is the distance into a volume in front of the display 125. The coordinates can extend beyond the display to the extent that the sensor 105 is operable. In one embodiment the representative image 210c can change in dimensions determined by the distance of the object 220c from the display 125 according to the z coordinate of the object 220c as determined by the controller 180 from the sensor 105 data. For example, if the controller 180 determines that at a first position the object 220c is 10 centimeters from the display and displays a representative image 210c on the display that is 5 centimeters in diameter and if the object 220c position changes to 20 centimeters from the display the diameter of the representative image 210c may become smaller or larger than 5 centimeters to indicate that he position of the object has been changed in the z coordinate. An example of the change in dimensions of the representative image is the representative image 210c is larger than the representative image 210b as the object 220c is further way from the display 125 than the object 220b. In an alternative embodiment, the size of the representative image 210 does not change if the z coordinate of the object 220 is changed.

The controller 180 can associate the position of the object 220 or the representative image 210 with a displayed element 115. If the object 220 or representative image 210 is associated with the displayed element 115 the displayed element 115 may be manipulated by the position of the object 220. For example, if the representative image 210 is moved in the x coordinate the associated displayed element 115 may be moved to the left or the right on the display 125 and if the representative image 210 is moved in the y coordinate the associated displayed element 115 may be moved up or down on the display 125. The displayed element 115 may also be zoomed in on or zoom out on if for example the object 120c changes z coordinate positions relative to a previous z coordinated position.

In one embodiment the controller 180 may also be able to manipulate the associated displayed element 115 by other characteristics of the object 220. For example if the object is rotated about an axis the displayed element may be rotated about a coordinate on the display 125.

Figure 3:
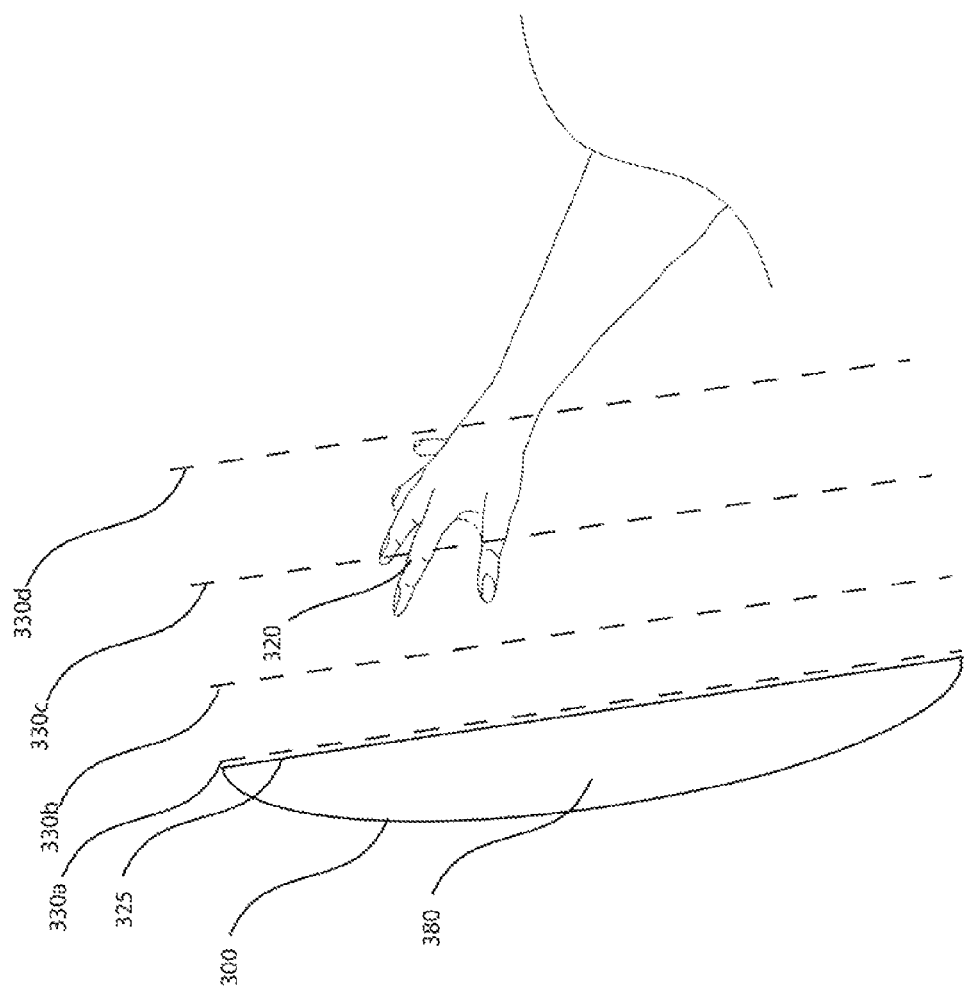
FIG. 3 is a system according to an example embodiment of the invention.

FIG. 3 is a system according to an example embodiment of the invention. The system 300 includes a display 325. The system 300 can include a sensor to determine the position of an object 320. The system 300 can include a controller 180. In one embodiment the controller 380 can associate different task to the presence of an object 320 within a volume extending from the display 325.

In one embodiment the controller 380 can determine if the object 320 is within a first volume 330c from the display before displaying a first or second representative image on the display 325. The sensor may have a threshold 330d where an object 320 may be detected if the object 320 is between the threshold 330d and the display 325. In one embodiment, other ranges may be set, for example the controller may include a threshold 330c and may not display a representative image on the display 325 of the object 320 until the object is between the threshold 330c and the display 325. Other thresholds may include for example 330b where a hover is indicated on the display or threshold 330a where a touch of the screen is determine by the controller 380 if the object is between the threshold 330a and the display 325. A hover refers to an event that occurs if the user moves or hovers a cursor over a particular area of an interface but does not touch the particular area.

Figure 4:
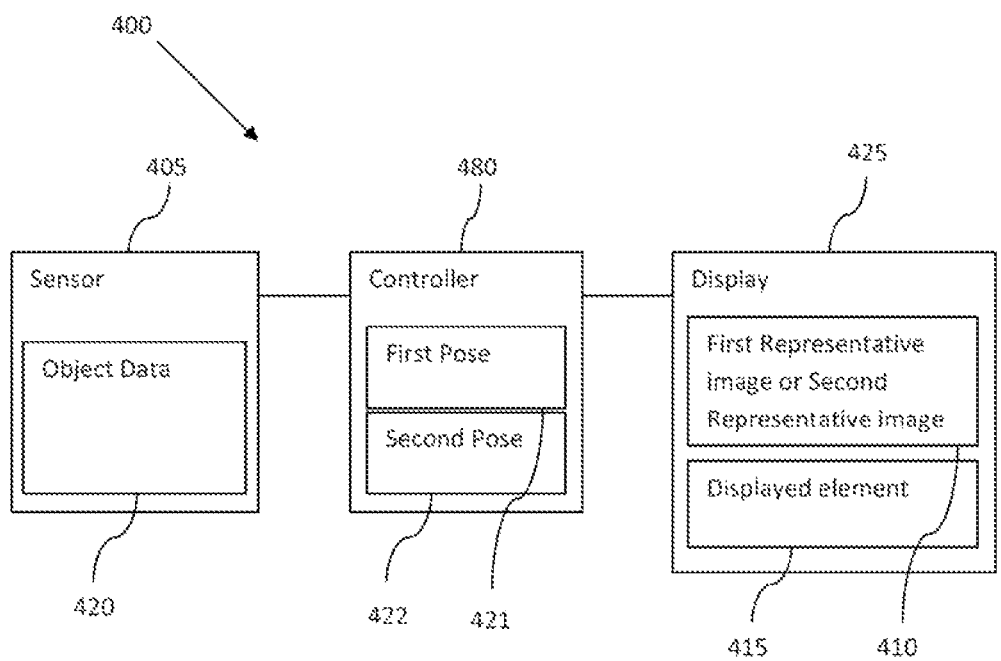
FIG. 4 is a block diagram according to an example embodiment of the invention.

FIG. 4 is a block diagram of a system 400 according to an example embodiment of the invention. The system 400 can include a sensor 405, a controller 480 and a display 425. The sensor 405 can detect an object and generate object data 420 about the object that is detected. The object data 420 may be used to determine the position of the object, the rotation of the object, the pose of the object or other characteristics of the object.

The controller 480 can take object data 420 from the sensor and determine if the pose of the object from the object data 420. The pose may be a first pose 421 or a second pose 422. The pose of the object determined from the object data can be for example an open object or a closed object such as a open hand or a closed hand.

The controller can be connected to the display 425. The display can display a representative image 410. The representative image 410 may be a first representative image if the controller determines from the object data that the object is in a first pose and the representative image 410 may be a second representative image if the controller determines from the object data that the object is in a second pose.

The controller 480 may also determine if the display 425 displays a displayed element 415. The displayed element 415 may be a window, an icon or another displayed image. The controller 480 can associate the displayed element 415 with the representative image 410.

Figure 5:
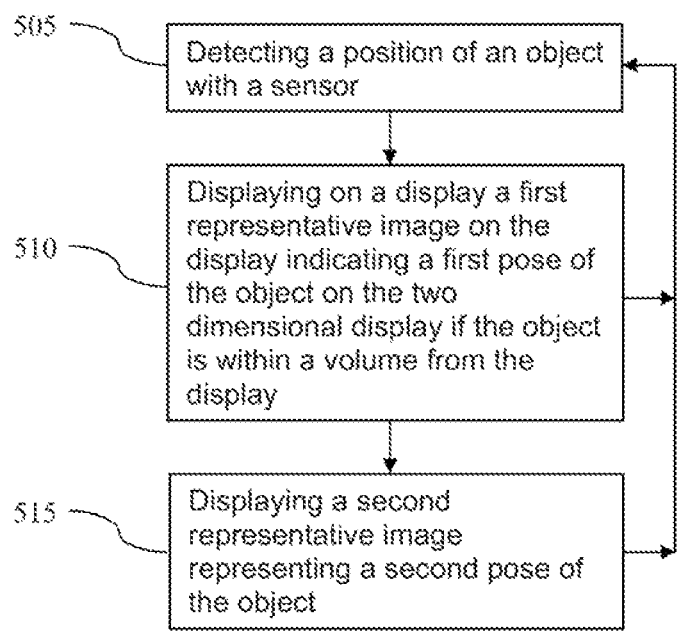
FIG. 5 is a flow chart according to an example embodiment of a method of the invention.

FIG. 5 is a flow chart according to an example embodiment of a method of the invention. The method begins by detecting the position of an object with a sensor at 505. The sensor may be connected to a controller to determine the position of the object from the data supplied by the sensor. The controller may determine the pose of the object from the data received from the sensor. A display can display a first representative image indicating the first pose of the object on the display if the object is within a volume extending from the display at 510. In one embodiment the volume that the object is within before the representative images are displayed can be the volume that can be detected by the sensor. In another embodiment the volume that the object is within before the representative images are displayed is less than the volume the sensors can detect objects in. The controller can determine the volume at which an object entering the volume causes the display to display a representative image.

The display can display a second representative image representing a second pose of the object at 515. After a first pose or a second pose is determined and a representative image of the first pose or the second pose is displayed the position of the hand may be redetected at 505 to determine the position of the first pose or the second pose.

The techniques described above may be embodied in a computer-readable medium for configuring a computing system to execute the method. The computer readable media may include, for example and without limitation, any number of the following: magnetic storage media including disk and tape storage media; optical storage media such as compact disk media (e.g., CD-ROM, CD-R, etc.) and digital video disk storage media; holographic memory; nonvolatile memory storage media including semiconductor-based memory units such as FLASH memory, EEPROM, EPROM, ROM; ferromagnetic digital memories; volatile storage media including registers, buffers or caches, main memory, RAM, etc.; and the Internet, just to name a few. Other new and various types of computer-readable media may be used to store the software modules discussed herein. Computing systems may be found in many forms including but not limited to mainframes, minicomputers, servers, workstations, personal computers, notepads, personal digital assistants, various wireless devices and embedded systems, just to name a few.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A system comprising:
   a display;
   a sensor to detect an object and generate data related to the object; and
   a controller to determine a first pose of the object from the data and display a first representative image on the display and, in response to a pose change, to determine a second pose of the object and display a second representative image on the display, wherein the second representative image is associated with a displayed element when the controller determines coordinates of the displayed element correspond to coordinates of the second representative image, wherein the first representative image and the second representative image are radially symmetric images having different respective diameters; and
   wherein the first representative image has dimensions that are determined by the distance of the object from the display determined by the controller from the data.

2. The system of claim 1, wherein the controller determines if the object is within a first volume from the display before displaying the first or second representative image on the panel.

3. The system of claim 1, wherein the first representative image is radially symmetric.

4. The system of claim 1, wherein the first representative image and the second representative image are repositioned on the display if the data indicates the object detected changed positions.

5. The system of claim 1, further comprising a storage including data accessed by the controller to determine if the first pose is one of a hand with fingers extended and a hand with fingers touching.

6. The system of claim 1, further comprising an enclosure including the display and the sensor.

7. A method, comprising:
   detecting a position of an object with a sensor;
   displaying on a display a first representative image on the display indicating a first pose of the object on the two dimensional display if the object is within a volume from the display;
   displaying a second representative image representing a second pose of the object in response to a pose change;
   associating the second representative image with a displayed element when the controller determines coordinates of the displayed element correspond to coordinates of the second representative image, wherein the first representative image and the second representative image are radially symmetric images having different respective diameters; and
   adjusting the size of the first or second representative image based on the distance from the display of the object.

8. The method of claim 7, further comprising detecting an orientation, distance from the display, and position while in a second pose of the object and rotating or moving the displayed element respectively.

9. The method of claim 7, further comprising activating a displayed element if the sensor detects an object within a touch distance from the display.

10. A non-transitory computer readable storage medium comprising instructions that if executed cause a processor of a computer to:
    detect a position of an object with a sensor;
    display on a display a first representative image on the display indicating a first pose of the object on the two dimensional display if the object is within a volume from the display;
    display a second representative image representing a second pose of the object on the two dimensional display if the object is within a volume from the display in response to a pose change, wherein the first representative image and the second representative image are radially symmetric images having different respective diameters;
    associate the second representative image with a displayed element when the controller determines coordinates of the displayed element correspond to coordinates of the second representative image; and
    adjust the size of the first or second representative image based on the distance from the display of the object.

11. The non-transitory computer readable storage medium of claim 10 further comprising instructions to move a displayed element that is connected to the second representative image if the second representative image is moved in one of an X, Y or Z direction according to the position of the object.

12. The system of claim 1, wherein the displayed element is associated with the object or the representative image if the pose of the object is closed.

13. The method of claim 7, further comprising associating the displayed element with the object or the representative image if the pose of the object is closed.

14. The non-transitory computer readable storage medium of claim 10 further comprising instructions to associate the displayed element with the object or the representative image if the pose of the object is closed.

* * * * *